Patented Aug. 31, 1954

2,687,967

UNITED STATES PATENT OFFICE 2,687,967

INORGANIC THERMOSETTING MOLDING COMPOSITION

Elmer J. Yedlick, Westfield, and Eileen R. Ford, Haledon, N. J., assignors to Garfield Manufacturing Company, a corporation of New Jersey No Drawing. Application March 12, 1954, Serial No. 415,970

13 Claims. (Cl. 106—39)

This invention relates to an inorganic molding composition which is adapted for producing ceramic material used in the field of electric insulation and methods of producing the same. The ceramic material of our invention is particularly useful for arc chutes, arc barriers, and high amperage insulation. This application is a continuation-in-part of our copending application Serial No. 262,348 filed December 18, 1951, now abandoned.

Portland-cement-asbestos compositions now widely used for arc barriers and other electric insulation absorb moisture unless impregnated with waxes and resins which adversely affect arc resistance. Shrinkage of the Portland cement varies upon setting and as a result the composition cannot be molded to close tolerances.

The present invention is based on our discovery that by combining an acid material such as phosphoric acid or certain acid salts of phosphoric acid with calcium silicate under proper conditions the acid or acid salt and calcium silicate can be made to unite under heat and pressure to give a dense non-porous ceramic material. The material has low water absorption, a smooth surface which reduces retention of water and it possesses much better arc resistance since there are no impregnated waxes or resins which tend to break down and carbonize under high amperage encountered during arcing conditions.

Such material may be conveniently formed by mixing a suitable calcium silicate such as Wollastonite with a proper proportion of acid material while maintaining the mass below room temperature until a homogeneous putty-like mixture is obtained. The mixture is then placed in a mold of the desired shape where it is subjected to heat and pressure which causes the acid material and silicate to react chemically and from a dense ceramic casting.

Wollastonite is the most convenient starting material for carrying out our invention, although any other calcium silicate may be employed such as Calsilite or Kaylo. Calsilite is a trade name for a synthetic calcium silicate which may be prepared by reacting lime and finely divided silica in contact with water at elevated pressures. The product is a complex calcium silicate having varying proportions of mono, di and tricalcium silicates. Kaylo is also a trade name for a synthetic calcium silicate and it may also be prepared by reacting lime and finely divided silica in contact with water at elevated pressures. The product has the probable formula

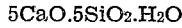

5CaO.5SiO₂.H₂O

As compared with these synthetic materials, Wollastonite is the meta silicate of calcium found in nature and it has the probable formula CaSiO₃. For best results, it is desirable to have a low percentage of metallic impurities such as iron or magnesium in the starting material because they tend to lower the insulating strength of the final product.

The amount and concentration of acid material is not critical and it may be varied within wide ranges. For our present purpose we prefer commercial 75% ortho-phosphoric acid in proportion of approximately ¼ to 1½ parts by weight for each 2 parts by weight of calcium silicate. For best results, the preferable range is 1 part by weight of acid to 2 parts by weight of silicate. It will be understood that acid strengths other than 75% may be used. However, we prefer to use 75% acid because it is the commercial grade most readily available.

As to the acid salts of phosphoric acid we have found the acid aluminum phosphate salts to be especially useful for our purpose. As is known, phosphoric acid and alumina combine to form either primary, secondary or tertiary phosphates, depending upon the number of hydrogens displaced by the aluminum. For our purpose the most useful compositions appear to be those between the mono-aluminum di-hydrogen and the di-aluminum monohydrogen phosphate. The proportion of aluminum oxide to phosphorous pentoxide varies from approximately 1 to 3 to 2 to 3, respectively. All of these are acid in nature and are available on the open market.

In using these acid aluminum phosphate salts for reaction with our calcium silicate we have found that best results are achieved by adding approximately that amount of salt required for introducing into the reaction mixture an amount of phosphorous pentoxide equal to that carried into the system by the 75% ortho-phosphoric acid within the ranges specified above. For example, if the selected aluminum phosphate salt contains approximately 27.1% of phosphorous pentoxide then the amount of salt employed is about twice that of 75% ortho-phosphoric acid (54.3% P₂O₅). That is to say, the preferred range for the acid salts is between approximately ½ to 3 parts by weight of salt for each two parts by weight of calcium silicate. Best results are achieved with about 2 parts by weight of salt for each 2 parts by weight of the silicate. In order to facilitate mixing of the acid salt with calcium silicate we prefer to use the salt in the form of a 50% water dispersion.

The above described ingredients may be mixed in any suitable kneading or blending machine, but at room temperature the acid material reacts so rapidly with the calcium silicate that solid pieces of material form before mixing can be completed and molded products formed with such a heterogeneous mixture have low mechanical and insulating strength. We have discovered, however, that by keeping the mass below room temperature (70° F.) and preferably below 32° F., it apparently becomes substantially inert and does not react with the acid. This enables us to achieve a smooth homogeneous acid mix which makes an excellent molding composition that may be stored indefinitely as long as it is kept cool. Although any convenient means of refrigeration may be used for cooling the mixture, we have achieved excellent results by cooling with Dry Ice. The Dry Ice is mixed with the calcium silicate until the mix temperature falls below 32° F. and then the acid material is added. During mixing additional quantities of Dry Ice may be added to maintain the required mix temperature. Depending upon the amount of Dry Ice added to the reaction mixture its temperature may be lowered to approximately minus 90° F., the temperature of Dry Ice itself.

Mixing of the above described ingredients is continued until it appears that a homogeneous mass has formed which is indicated by an even, putty-like consistency of the mix. Mixing is then stopped and we are now ready to react the acid material and silicate to form our ceramic material.

This reaction is best carried out at a temperature of approximately 150° F. to 400° F. and under a pressure of approximately 500 pounds per square inch to 7 tons per square inch for a period of time varying from a few seconds to several minutes, depending upon the amount of material. We prefer a temperature of approximately 250° F. due to the extreme corrosive action of the acid materials on metals at higher temperature and we have found it convenient to carry out the reaction directly in a mold. The cold, putty-like mass readily lends itself to hot pressure molding by conventional equipment and its consistency is such that it is especially adapted to the production of pieces with intricate design.

For the purpose of illustration, and in order to point out the best method now known to us of carrying out this invention, the following specific examples are given:

*Example 1*

4000 grams of Wollastonite having particles of a size which pass through a 325-mesh sieve and 2000 grams of Dry Ice are mixed in a conventional mixing machine until the temperature of the mass has fallen below 32° F. 2000 grams of 75% orthophosphoric acid are added and mixing is continued until a homogeneous mass having an even putty-like consistency is formed. A portion of this mass is then placed in the cavity of a heated mold and subjected to a pressure of 3.5 tons per square inch for times varying from a few seconds to several minutes, depending upon the amount of material used. For example with 30 grams of material it required 2 minutes for the acid and calcium silicate to react.

The product is a dense, non-porous dead-white body which may be sawed, drilled and machined without tearing or splitting. It is strong, non-hygroscopic and it will withstand heat and high voltage without electric breakdown. The properties which make the material exceptionally useful in the field of electric insulation are its low porosity and non-hygroscopic characteristics which keep surface leakage of electricity at a minimum and give high insulating strength.

The method of Example 1 was repeated with good results as follows:

|  | Example 2 | Example 3 |
|---|---|---|
| Wollastonite having particles of a size which pass through a 325-mesh sieve_____grams__ | 4,000 | 4,000 |
| Dry Ice_____do____ | 2,000 | 2,400 |
| Ortho Phosphoric acid (75%)_____do____ | 1,200 | 3,000 |
| Mold Pressure_____pounds per square inch__ | 7,000 | 7,000 |
| Temperature_____° F__ | 240 | 240 |
| Reaction time for 30 grams of material__minutes__ | 5 | 1 |

|  | Example 4 | Example 5 |
|---|---|---|
| Wollastonite having particles of a size which pass through a 325-mesh sieve_____grams__ | 4,000 | 4,000 |
| Dry Ice_____do____ | 2,000 | 2,400 |
| 70.7% water dispersion aluminum acid phosphate containing approximately 24.5% by weight P₂O₅ and 6.4% by weight Al₂O₃__grams__ | 1,080 | 2,160 |
| Mold Pressure_____pounds per square inch__ | 7,000 | 7,000 |
| Temperature_____° F__ | 240 | 240 |
| Reaction Time for 30 grams of material__minutes__ | 6 | 2 |

|  | Example 6 | Example 7 |
|---|---|---|
| Wollastonite having particles of a size which pass through a 325-mesh sieve_____grams__ | 4,000 | 4,000 |
| Dry Ice_____do____ | 2,000 | 2,400 |
| Aluminum acid phosphate containing approximately 33.1% by weight P₂O₅ and 8.6% by weight Al₂O₃ (50% water dispersion)__grams__ | 1,970 | 4,921 |
| Mold Pressure_____pounds per square inch__ | 7,000 | 7,000 |
| Temperature_____° F__ | 240 | 240 |
| Reaction time for 30 grams of material__minutes__ | 6 | 2 |

We have found that in some applications my molding composition can with advantage be modified by the addition of a small amount of an inorganic filler having fibers of relatively long length. The longer fibers apparently reinforce the casting to give a product of exceptionally high mechanical strength. Examples of such filler which we have used with excellent results are glass fibers and amosite or chysotile asbestos. For best results we prefer to use a filler with an average fiber length of approximately ¼ to ⅜-inch.

The method of Example 1 was used with the following compositions to produce ceramic castings having exceptionally high mechanical strength:

|  | Example 8 | Example 9 | Example 10 | Example 11 |
|---|---|---|---|---|
| Wollastonite having particles of a size which pass through a 325-mesh sieve__ | *Grams* 4,000 | *Grams* 4,000 | *Grams* 4,000 | *Grams* 4,000 |
| Dry Ice_____ | 2,000 | 2,000 | 2,000 | 2,000 |
| Ortho Phosphoric Acid (75%)_____ | 2,100 | 2,100 | 2,400 | 3,200 |
| Chrysotile asbestos (Average length of fiber ¼ to ⅜ inch)_____ | 200 | 400 | 800 | 1,200 |

|  | Example 12 | Example 13 | Example 14 |
|---|---|---|---|
| Wollastonite having particles of a size which pass through a 325-mesh sieve_____ | *Grams* 4,000 | *Grams* 4,000 | *Grams* 4,000 |
| Dry Ice _____ | 2,000 | 2,400 | 2,000 |
| Ortho Phosphoric Acid (75%)_____ | 2,100 | 2,500 | 3,000 |
| Glass Fiber (average length of fiber ¼ to ⅜ inch) | 200 | 400 | 800 |

|  | Example 15 | Example 16 |
|---|---|---|
| Wollastonite having particles of a size which pass through a 325-mesh sieve_____ | *Grams* 4,000 | *Grams* 4,000 |
| Dry Ice_____ | 2,000 | 2,000 |
| Ortho phosphoric acid (75%)_____ | 2,000 | 2,100 |
| Amosite asbestos (average length of fiber ¼ to ⅜ inch)_____ | 200 | 400 |

Although we have described our invention in connection with hot pressure molding of a dielectric material, it will be clearly understood that the examples are intended to give an illustration of one way that this invention can be carried out and is not intended to imply any limitations on the variations that may be employed.

What we claim is:

1. A thermosetting composition adapted to be molded under heat and pressure consisting essentially of a mixture of approximately 2 parts of finely ground calcium silicate and an acid material selected from the group consisting of phosphoric acid and an acid aluminum phosphate salt, said acid material being present in an amount sufficient to give the mixture a phosphorous pentoxide content approximately equal to that of a mixture of 2 parts by weight of calcium silicate and between approximately one-quarter to one and one-half parts by weight of 75% orthophosphoric acid and said mixture being at a temperature low enough substantially to prevent reaction between the ingredients.

2. A composition as specified in claim 1 which is maintained at a temperature between approximately minus 90° F. to approximately below 32° F. prior to molding.

3. A composition as specified in claim 1 which includes a minor portion of an inorganic fibrous silicate filler having an average fiber length of approximately ¼ to ⅜ inch.

4. A composition as specified in claim 1 which includes a minor proportion of an inorganic fibrous silicate filler selected from the group consisting of glass fibers, amosite asbestos and chrysotile asbestos.

5. A composition as specified in claim 1 in which the acid aluminum phosphate salt is added in the form of a 50% by weight dispersion of the salt in water.

6. A composition as specified in claim 1 in which the calcium silicate is Wollastonite.

7. A molded product adapted for use in arc chutes and other designs for confining high power arcs produced by reacting under heat and pressure a mixture of approximately 2 parts of finely ground calcium silicate and an acid material selected from the group consisting of phosphoric acid and an acid aluminum phosphate salt, said acid material being present in the mixture in an amount sufficient to give a phosphorous pentoxide content approximately equal to that of a mixture of two parts by weight of calcium silicate and between approximately one-quarter to one and one-half parts by weight of 75% orthophosphoric acid.

8. A molded product adapted for use in arc chutes and other designs for confining high power arcs produced by reacting under heat and pressure a mixture of approximately two parts of finely ground calcium silicate and an acid material selected from the group consisting of phosphoric acid and an acid aluminum phosphate salt and a minor proportion of a fibrous silicate filler having an average fiber length of approximately ¼ to ⅜ inch, said acid material being present in an amount sufficient to give the mixture a phosphorous pentoxide content approximately equal to that of a mixture of two parts by weight of calcium silicate and between approximately one-quarter to one and one-half parts by weight of 75% ortho-phosphoric acid.

9. A molded product as specified in claim 7 in which the calcium silicate of the reaction mixture is Wollastonite.

10. The method of producing an inorganic dielectric material which comprises the steps of mixing approximately two parts by weight of finely ground calcium silicate with that amount of an acid material selected from the group consisting of phosphoric acid and an acid aluminum phosphate salt that will give the resulting admixture a phosphorous pentoxide content approximately equal to that of a mixture of two parts by weight of calcium silicate and between approximately one-quarter to one and one-half parts by weight of 75% ortho-phosphoric acid while maintaining the ingredients at a temperature low enough substantially to prevent reaction between the ingredients and then subjecting the resulting mass to heat and pressure to form a solid ceramic material.

11. The method of producing an inorganic dielectric material which comprises the steps of mixing approximately two parts by weight of finely ground Wollastonite with sufficient quantity of Dry Ice to lower the mix temperature to a value between approximately minus 90° F and approximately 32° F., adding that amount of an acid material selected from the group consisting of phosphoric acid and an acid aluminum phosphate salt that will give the resulting admixture a phosphorous pentoxide content approximately equal to that of a mixture of two parts by weight of calcium silicate and between approximately one-quarter to one and one-half parts by weight of 75% ortho-phosphoric acid, continuing said mixing while maintaining the mix temperature at a value between approximately minus 90° F. and approximately 32° F. with additional quantities of Dry Ice until a smooth homogeneous putty-like mass is obtained and subjecting said mass to heat and pressure to form a solid ceramic material.

12. The method of producing an inorganic dielectric material which comprises the steps of mixing approximately two parts by weight of finely ground Wollastonite with sufficient quantity of Dry Ice to lower the mix temperature to a value between approximately minus 90° F and approximately 32° F., adding that amount of an acid material selected from the group consisting of phosphoric acid and an acid aluminum phosphate salt that will give the resulting admixture a phosphorous pentoxide content approximately equal to that of a mixture of two parts by weight of calcium silicate and between approximately one-quarter to one and one-half parts by weight of 75% ortho-phosphoric acid, continuing said mixing while maintaining the mix temperature at a value between approximately minus 90° F. and approximately 32° F. with additional quantities of Dry Ice until a smooth homogeneous putty-like mass is obtained and subjecting said mass to heat and pressure to form a solid ceramic material, placing a portion of the resulting mixture in a hot mold, heating the material in the mold to a temperature of approximately 150 to 400° F., subjecting said material to a pressure of approximately 500 pounds per square inch to 7 tons per square inch and holding said material at such temperature and pressure while the acid and calcium silicate react to form a solid ceramic body.

13. The method specified in claim 10, which includes the step of adding aluminum acid phosphate salt in the form of a 50% by weight dispersion of the salt in water.

No references cited.